March 4, 1969  H. P. FURTH  3,430,472
MAGNETIC DEVICE FOR FORMING SHEET METAL
Filed Aug. 25, 1967
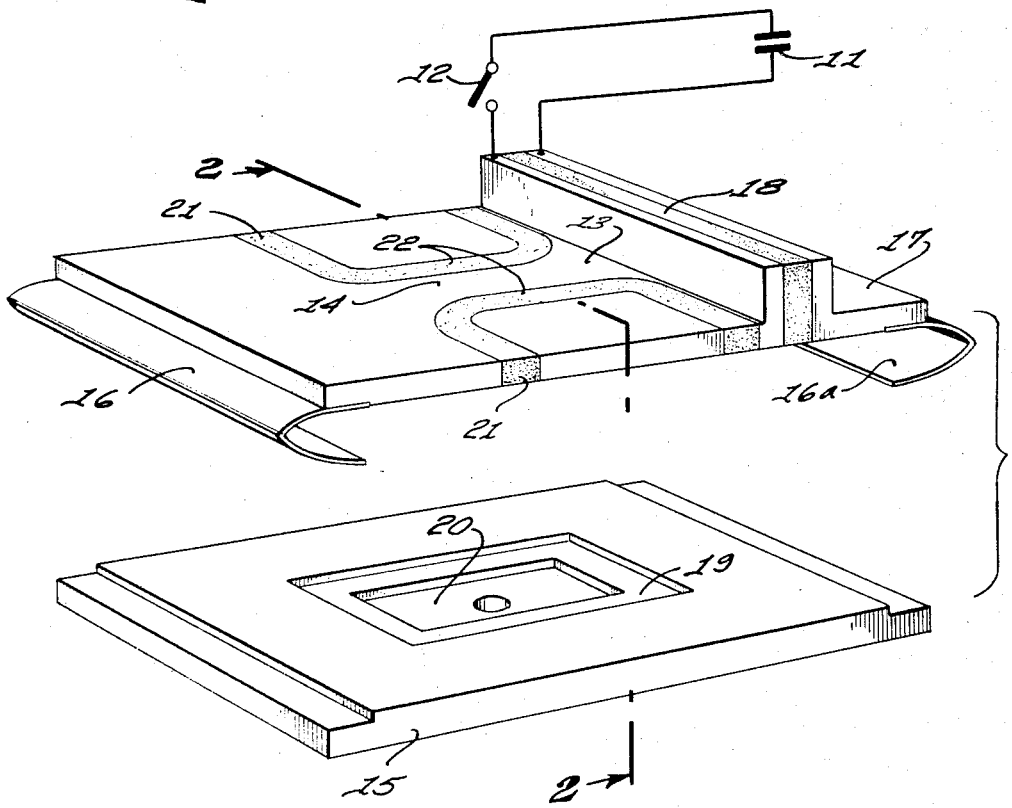
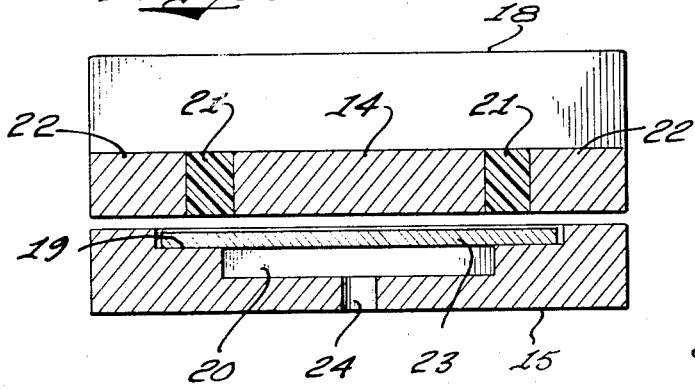
INVENTOR
HAROLD P. FURTH
BY John A. Duffy
ATTORNEY United States Patent Office 3,430,472
Patented Mar. 4, 1969

3,430,472
MAGNETIC DEVICE FOR FORMING
SHEET METAL
Harold P. Furth, Princeton, N.J., assignor to Advanced Kinetics, Inc., Costa Mesa, Calif., a corporation of California
Substituted for abandoned application Ser. No. 273,621, Apr. 17, 1963. This application Aug. 25, 1967, Ser. No. 674,030
U.S. Cl. 72—56                                    1 Claim
Int. Cl. B21d 26/02; B21j 5/04

ABSTRACT OF THE DISCLOSURE

The present disclosure provides a device for magnetic forming of sheet metal between two parallel plates of conductor which are used as the two halves of a plane parallel high current transmission line. During the current pulse, the magnetic field within this forming system tends to be parallel to the plane of the sheet metal unidirectional and highly uniform in strength so that high uniformity in the forming process can be achieved.

---

This invention relates to the forming of sheet metal by magnetic pressure and more particularly to the forming of sheet metal within a high-current plane parallel transmission line.

A piece of sheet metal can be formed by means of a pulsed magnet coil placed against it, the magnetic field pressure serving to force the sheet metal into a mold. The magnetic field pressure due to such a coil tends to be nonuniform over the surface of the sheet metal to be formed. When a high degree of uniformity in the forming process is desired, magnetic forming, by means of a magnet coil is therefore unsuitable.

Accordingly it is an object of this invention to provide an improved device for magnetic forming of sheet metal.

The device of the present invention provides a magnetic forming device wherein a metal work piece is placed between a pair of conducting plates generating magnetic fields. Means are provided for providing a higher strength field on one side of the metal piece than the other. Then, in accordance with magnetic forming, the higher strength field forces the metal work piece towards the conducting plate generating the weaker field and thereby forms the metal.

These and other objects and advantages of the present invention will become apparent from the following description and appended claim.

In the drawings:
FIGURE 1 is a schematic perspective view of the transmission line system for magnetic forming.
FIGURE 2 is a cross-sectional end view of the forming system of FIGURE 1, showing the sheet metal to be formed.

When a piece of sheet metal is pressed against a mold by means of a pulsed magnetic field from a magnet coil, the magnetic flux of the coil passes out through one end of the bore of the coil, then radially outward in the space between the coil and the sheet metal, and then back into the other end of the bore of the coil. The constriction of the radially outward pointing magnetic flux between the sheet metal and the coil gives rises to the magnetic pressure that forms the metal. The resultant magnetic pressure cannot be perfectly shaped, since the radial magnetic field must always be null on the coil axis.

A perfectly uniform magnetic pressure can be applied only by means of a perfectly uniform magnetic field, that is to say, a magnetic field parallel to the sheet metal and pointing everywhere in the same direction. In that way, there is nowhere on the surface of the sheet metal a null in the magnetic field. When a piece of sheet metal is placed by itself within such a uniform pulsed magnetic field, no net force on the sheet metal results, since the magnetic pressures against both surfaces of the sheet metal are equal. In order to achieve forming of the sheet metal against a mold, it is necessary to provide means whereby a strong uniform magnetic field appears against only one face of the sheet metal, while a weaker magnetic field, or no magnetic field, appears against the other face. The differential magnetic pressure may be expressed as:

$$P_m = \frac{B_1^2}{8\pi} - \frac{B_2^2}{8\pi} \qquad (1)$$

where $B_1$ is the strength in gauss of the magnetic field against the front of the sheet metal, while $B_2$ is the strength of the magnetic field against the back of the sheet metal, and $P_m$ is the resultant net pressure in dynes. It is seen from Equation 1 that if $B_2$ is less than half of $B_1$ then the net pressure is more than 75% of what it would be in the absence of $B_2$. Therefore, a magnetic forming system that reduces the magnetic field against the back of the sheet metal to less than half of the magnetic field against the front of the sheet metal is able to provide reasonably efficient utilization of the magnetic field in the forming operation.

The magnetic field strength on the back of a piece of sheet metal can be reduced by constricting the magnetic flux path. The manner in which such constriction can be accomplished in a practical way is made clear in the forming system shown in FIG. 1. A capacitor bank 11 is discharged by means of a switch 12 and a current pulse is fed to a conducting plate 13. The current passes through the narrow section 14 of the plate 13, and is then passed to a second conducting plate 15 by means of a flexible conducting strip 16. The current then flows through the strip 16a onto the short conducting plate 17, and back to the capacitor bank 11, thus completing the circuit. The conducting plates 13 and 17 are fastened mechanically and insulated electrically by means of the insulating strip 18. Into the shallow well 19 of the conducting plate 15 a piece of sheet metal may be placed. Magnetic pressure can then be used to force the sheet metal against a mold, located in the deeper well 20. The pulsed current flows on those surfaces of plates 13 and 15 that are nearest to each other and an associated magnetic field appears between the two plates. Since the current density is highest in the region 14 of plate 13, the magnetic field is strongest there. The magnetic field lines pass between the conductor strip 14 and plate 15, and then tend to pass outward through the insulating strips 21. The auxiliary conducting plates 22, which are impermeable to a fast pulsed magnetic field, assist in forcing the magnetic flux to flow outward through the insulating strips 21.

The position of the sheet metal within the magnetic field is made clear in FIGURE 2, which is a cross sectional end view of the forming system of FIGURE 1, the section being taken across the conductor strip 14, in the direction transverse to the current flow. A piece of sheet metal 23 lies within the well 19 of the conducting plate 15. Optional means for removing the air from the mold 20 are provided through the aperture 24 to facilitate the expansion of the sheet during the forming operation. If the sheet metal is allowed to make electrical contact with the plate 15 then no magnetic field can pass between the sheet metal and the plate 15. The pressure of the magnetic field appearing between the sheet metal and the plate 15. The pressure of the magnetic field appearing between the sheet metal 23 and the conductor strip 14 is then unopposed, and the unbalanced magnetic pressure forces the sheet metal into a mold that may be located in the well 20. The disadvantage of providing such direct electrical contact between the sheet metal 23 and the plate 15 is that large currents will flow through the contact surface and these may cause sparking and burning, thus marring the surface of the sheet metal. If it is desired to prevent such damage, as will generally be the case, the sheet metal 23 should be insulated from the plate 15 by means of a thin sheet of insulation covering the part of the surface of the well 19 that comes into contact with the sheet metal 23. In that case, magnetic fields can appear in the region between the sheet metal 23 and the conducting plate 15, but the configuration of the forming system is such as to constrict the magnetic flux path around the back of the sheet metal, and thus tends to make the magnetic field on the back significantly weaker than the magnetic field on the front. A typical magnetic field line lies in the plane of FIGURE 2 and passes between the front of the conductor strip 14 and the sheet metal 23, and then out through the insulator strips 21. A magnetic field line passing on the back of the sheet metal 23 has to pass through the constricted space between the sheet metal 23 and the surface of the well 19, then has to bend sharply and pass through the constricted space between the sheet metal 23 and the auxiliary conductor strips 22. Particularly if the space allowed initially between the back surface of the sheet metal and the surface of the mold is considerably wider than the other flux passages, the magnetic field against the back of the sheet metal will tend to be very weak.

It is claimed:
1. A magnetic metal forming device comprising:

a first conducting plate connected to a current source and having a portion shaped to provide a magnetic field of high strength, a second conducting plate parallel to said first conducting plate, means for conductively connecting said first plate to said second plate to provide a magnetic field of low strength, a metal workpiece positioned within said magnetic fields between said plates, whereby said high strength magnetic field forces said workpiece against said second plate, said second plate having a well to receive said metal workpiece, said shaped portion of said first conducting plate including a pair of insulating strips separating said first plate into a main conducting plate and a pair of auxiliary conducting plates, the main conducting plate being opposite said metal workpiece.

References Cited

UNITED STATES PATENTS

| | | | |
|---|---|---|---|
| 2,976,907 | 3/1961 | Furth | 72—56 |
| 3,114,585 | 12/1963 | Brower et al. | 72—56 |
| 3,115,857 | 12/1963 | Pfanner | 72—56 |
| 3,171,014 | 2/1965 | Ducati | 72—56 |
| 3,187,532 | 6/1965 | Furth | 72—56 |

RICHARD J. HERBST, *Primary Examiner.*